United States Patent [19]

Pangborn et al.

[11] 4,192,726

[45] Mar. 11, 1980

[54] THERMOELECTROCHEMICAL PROCESS USING COPPER SULFATE FOR PRODUCING HYDROGEN AND OXYGEN FROM WATER

[75] Inventors: Jon B. Pangborn, Lisle; James R. Dafler, Lombard, both of Ill.

[73] Assignee: Gas Research Institute, Chicago, Ill.

[21] Appl. No.: 957,893

[22] Filed: Nov. 6, 1978

[51] Int. Cl.² ........................... C25B 1/04; C25B 1/12
[52] U.S. Cl. .................................................... 204/129
[58] Field of Search .......................................... 204/129

[56] References Cited

U.S. PATENT DOCUMENTS 3,824,163  7/1974  Maget .................. 204/130

Primary Examiner—R. L. Andrews
Attorney, Agent, or Firm—Thomas W. Speckman

[57] ABSTRACT

A thermoelectrochemical process for production of hydrogen and oxygen from water providing a closed cycle reactant regenerative process wherein the primary energy input is thermal and a smaller electrical energy input is required for an electrolysis step. The process is a hybrid copper oxide-copper sulfate water splitting cycle.

21 Claims, 3 Drawing Figures

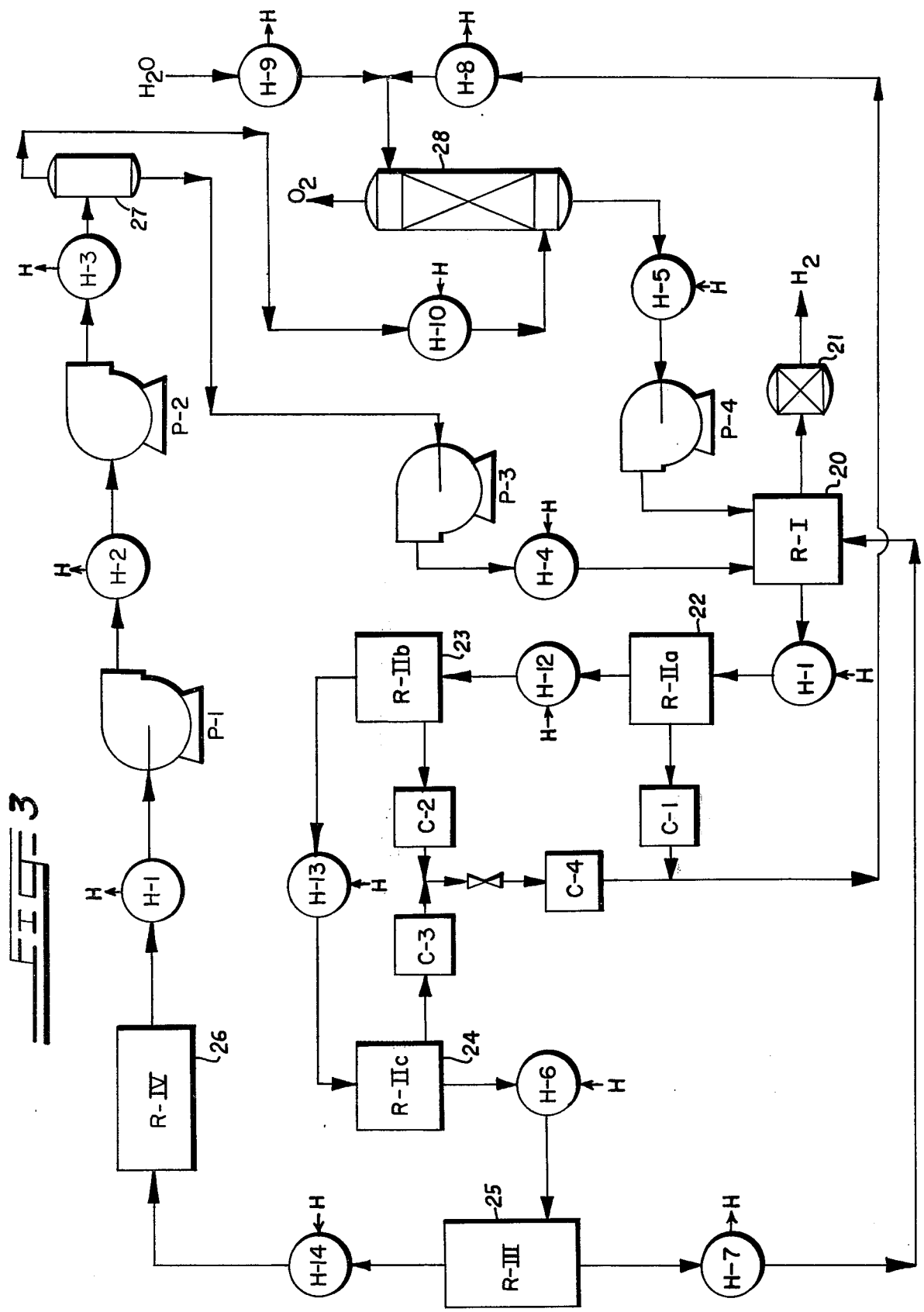

THERMOELECTROCHEMICAL PROCESS USING COPPER SULFATE FOR PRODUCING HYDROGEN AND OXYGEN FROM WATER

This invention relates to a thermoelectrochemical process for production of hydrogen and oxygen from water. The process provides a closed cycle reactant regenerative process for the production of hydrogen and oxygen from water requiring input of water, heat and a relatively small amount of electrical energy. The process is a hybrid copper oxide-copper sulfate water splitting cycle.

Thermochemical cycles to produce hydrogen have been sought in recent years to provide hydrogen for use both as a fuel and as a chemical reactant. Especially in view of ecological and pollution considerations, the use of hydrogen as a fuel has attained greater significance. Hydrogen may be produced from water, a cheap and abundant raw material, and when burned reverts to water, a natural, non-polluting substance. Hydrogen also affords extreme flexibility in its utilization as a fuel providing advantages in many ways over present fuels for power sources such as turbines, reciprocating engines and fuel cells.

The present commercial method for the production of hydrogen is the direct electrolysis of water into its constituent elements of hydrogen and oxygen. The electrolysis process is dependent only upon electricity, and therefore its economics are dependent upon generation of electrical energy which is relatively inefficient. Further, present industrial electrolyzers are very expensive.

Direct thermodecomposition of water is not promising, since water starts decomposing with a reasonable yield at temperatures of 2,500° to 3,000° C. These temperatures are not attainable from heat sources such as nuclear reactors. Therefore, thermochemical cycles for production of hydrogen and oxygen from water at temperatures attainable from the output coolant of nuclear reactors and from solar energy sources would be desirable. With the greatly expanded use of nuclear reactors, it would be advantageous to utilize the heat given off by the reactor to produce hydrogen and oxygen from the water molecule providing a new fuel. High temperature gas reactors have output coolant temperatures in the order of 500° to 900° C. This heat output represents at least 80 percent of the product energy from the nuclear reactor. Recent trends have been toward increases in the output coolant temperature and such temperatures in the order of 1,000° to 1,200° C. can be expected as a development of present technology and as a possible goal for nuclear fusion reactors in the future. Thermochemical processes for the production of hydrogen, utilizing such heat energy, have been sought in recent years.

Various thermochemical cycles for the production of hydrogen and oxygen from water have been referred to in U.S. Pat. No. 3,907,980. The process disclosed in U.S. Pat. No. 3,907,980 is illustrative of a process for production of hydrogen and oxygen from water combining thermo and electrochemical reactions. The process disclosed by U.S. Pat. No. 3,907,980 teaches electrically hydrolyzing a cadmium anode and recycling the cadmium to the electrolysis reaction with removal of hydrogen and oxygen from the reaction system.

Thermochemical cycles for the production of hydrogen and oxygen from water utilizing sulfur oxides have been proposed. One process known as The Westinghouse Sulfur Cycle, is a two-step thermochemical cycle for decomposition of water into hydrogen and oxygen wherein oxides of sulfur serve as recycled intermediates within the system. The process is described in the paper The Westinghouse Sulfur Cycle for the Thermochemical Decomposition of Water, L. E. Brecher, S. Spewock and C. J. Warde, in 1st World Hydrogen Energy Conference, Conference Proceedings edited by T. Nejat Veziroglu, Vol. 1, Miami Beach, Florida, March 1976. One disadvantage of the Westinghouse Sulfur Cycle is that it involves concentrated acids, principally sulfuric acid, leading to corrosion of process plant components.

Another proposed thermochemical water splitting process for the production of hydrogen and oxygen is a cycle based upon sulfur and iodine which was described first by Russell of General Atomic Company in "Water-Splitting—A Progress Report", First World Hydrogen Energy Conference Proceedings, Vol. 1, Miami Beach, Florida, March 1976. The process is further described in a paper presented at the Ninth Synthetic Pipeline Gas Symposium, Oct. 31–Nov. 2, 1977, Des Plaines, Illinois, J. R. Schuster, J. L. Russell, Jr., J. H. Norman, T. Ohno and P. W. Trester, "Status of Thermochemical Water-Splitting Development at General Atomic", General Atomic Report GA-A14666, October, 1977. The General Atomic process involves both sulfuric acid and hydrogen iodide causing corrosion problems in conventional plant process equipment.

It is an object of this invention to provide a process for producing hydrogen and oxygen from water which overcomes many of the disadvantages of the above processes.

It is another object of this invention to provide a process for producing hydrogen and oxygen from water wherein the primary energy requirement is thermal; with a smaller electrical energy input being required for an electrolysis step.

It is a further object of this invention to provide an efficient combined thermochemicalelectrochemical process for the production of hydrogen and oxygen from water.

It is yet another object of this invention to provide a process for producing hydrogen and oxygen from water which does not involve corrosive materials, such as acids, and thus permit plant construction of more economical materials.

It is still a further object of this invention to provide a process for producing hydrogen and oxygen from water which can produce pressurized hydrogen thereby eliminating or reducing later compression requirements when pressurized hydrogen is desired.

It is a further object of this invention to provide a process for the production of hydrogen and oxygen from water in which the reactants other than water, are regenerated and the reaction may be conducted in a closed cycle.

It is yet another object of this invention to provide a process for the production of hydrogen and oxygen from water wherein the thermal coolant output of nuclear reactors and/or solar energy sources, may be used to provide the thermal energy input.

These and other objects, advantages and features of this invention will be apparent from the description together with the drawings, wherein:

FIG. 3 is one embodiment of a process flow layout for the closed reactant regenerative cycle shown in FIG. 1.

This invention provides a process for the production of hydrogen and oxygen from water in a reactant regenerative closed cycle process comprising the steps of electrolytically oxidizing in an electrolytic cell an aqueous solution of sulfur dioxide in the presence of copper oxide to produce aqueous copper sulfate solution in the anode chamber while producing hydrogen in a separated cathode chamber and removing the produced hydrogen from the cycle; thermally dehydrating crystallized copper sulfate pentahydrate to copper sulfate and steam; and thermally decomposing copper sulfate to copper oxide and sulfur dioxide for recycle to said electrolytic cell and to oxygen which is removed from the cycle.

The chemical reactions taking place in the overall process may be expressed by the following chemical equations:

$$CuO_{(s)} + SO_{2(g)} + 6H_2O_{(l)} \rightarrow CuSO_4 \cdot 5H_2O_{(s)} + H_{2(g)} \qquad \text{I.}$$

$$CuSO_4 \cdot 5H_2O_{(s)} \rightarrow CuSO_{4(s)} + 5H_2O_{(g)} \qquad \text{II.}$$

$$CuSO_4 \cdot 5H_2O_{(s)} \rightarrow CuSO_4 \cdot 3H_2O_{(s)} + 2H_2O_{(g)} \qquad \text{(a)}$$

$$CuSO_4 \cdot 3H_2O_{(s)} \rightarrow CuSO_4 \cdot H_2O_{(s)} + 2H_2O_{(g)} \qquad \text{(b)}$$

$$CuSO_4 \cdot H_2O_{(s)} \rightarrow CuSO_{4(s)} + H_2O_{(g)} \qquad \text{(c)}$$

$$CuSO_{4(s)} \rightarrow CuO_{(s)} + SO_{3(g)} \qquad \text{III.}$$

$$SO_{3(g)} \rightarrow SO_{2(g)} + 1/2 O_{2(g)} \qquad \text{IV.}$$

Figure 1:
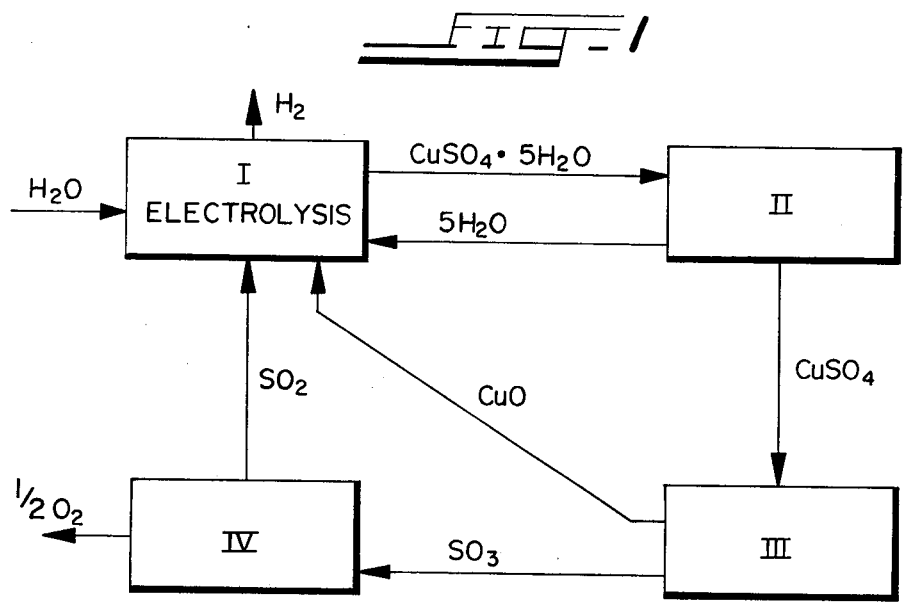
FIG. 1 is a schematic flow diagram of one embodiment of a closed cycle for production of hydrogen and oxygen according to this invention.

The combination of the above reactions, utilized in one embodiment of this invention, are schematically shown in the flow diagram of FIG. 1. Further description of the above reactions is set forth in the following description setting forth preferred embodiments of this invention in a reactant regenerative closed cycle. By the term "reactant regenerative closed cycle" is meant a system which minimizes the addition of reactant chemicals other than water and which minimizes reaction products to be removed from the cycle other than the desired gaseous hydrogen and gaseous oxygen. Make-up reactant chemicals may, of course, be added as necessary. Throughout this description and claims, the terms "water" and "steam" are used recognizing that under appropriate process conditions of temperature and pressure, either may be present and thus both of these terms refer to both liquid and vapor phases.

The reaction expressed by Equation I is an electrolysis reaction which proceeds in an electrolytic cell in which the cathode chamber is separated from the anode chamber. Reaction I, as written, is the sum of the anode and cathode reactions. In the anode chamber, sulfuric acid is generated along with hydrogen ions. In the presence of sulfuric acid and water in the anode chamber, slurried copper oxide reacts to form aqueous copper sulfate solution. The chemical reactions in the electrolytic cell may be expressed by the following chemical equations:

$$SO_{2(g)} + 2H_2O_{(l)} \rightarrow H_2SO_{4(aq)} + 2H^+ + 2e^- \qquad \text{Ia.}$$

$$CuO_{(s)} + H_2SO_{4(aq)} + 4H_2O_{(l)} \rightarrow CuSO_4 \cdot 5H_2O_{(aq)} \qquad \text{Ib.}$$

The net reaction in the anode chamber is given by Equation Ic, the anodic half-cell reaction:

$$CuO_{(s)} + SO_{2(g)} + 6H_2O_{(l)} \rightarrow CuSO_4 \cdot 5H_2O_{(aq)} + 2H^+ + 2e^- \qquad \text{Ic.}$$

Hydrogen ions generated in the anode chamber migrate to the cathode chamber, through the separator, where they are electrolyzed to hydrogen gas at the cathode. The cathodic reaction is:

$$2H^+ + 2e^- = H_{2(g)} \qquad \text{Id.}$$

The net electrolytic cell reaction, the sum of Ic+Id, is reaction I, as written above.

The electrochemical cell must be operated so that substantially no sulfur oxides or hydrogen sulfur oxides can diffuse into the cathode chamber. Suitable separators for the electrochemical cell may be any porous medium or membrane which accomplishes the above objective. Microporous polyethylene is satisfactory and other commercially available cell or battery separators are suitable. A small amount of the catholyte may be convected through the anode-cathode separator as a means to prevent diffusion of sulfur oxides or hydrogen sulfur oxides into the cathode chamber. This is most conveniently done by maintaining a very slight, 10–20 cm water column, pressure difference between the catholyte and anolyte chambers. This can be accomplished by using different heights of their respective electrolyte levels. Copper oxide is slurried in water in the anode chamber and sulfur dioxide is sparged into the anolyte. Copper sulfate, in aqueous solution, is produced in the anode chamber while producing hydrogen in the separated cathode chamber as more fully described above. Noble metal electrodes, such as platinum are suitable for the electrolysis reaction. Tests have shown, using distilled water as the electrolyte and 0.010 inch thick separator of micro-porous polyethylene sheet material sold by W. R. Grace Company under the mark DARAMIC for automotive battery separator material, using a 10 cm water column pressure differential between the cathode chamber and anode chamber, that hydrogen gas was generated in the cathode chamber while copper sulfate in solution was recovered from the anolyte in the anode chamber following operation at cell voltages between about 0.6 and 0.85 volts and current densities of 10 to 25 mA/cm$^2$ (E°$_{298}$=0.150 volts). Laboratory tests have indicated that the desired reaction proceeds at potentials as low as 0.45 volts and that with optimized conditions the potentials may be lower. Fluidized electrolyte systems permitting large current densities at low polarizations may be used in highly mixed electrolyte cell systems.

One important aspect of this invention is the low electrical potential requirement for the electrolysis reaction of Equation I. Conventional electrolysis to produce hydrogen and oxygen from water requires electrical potentials greater than about 1.48 volts, while the electrical potential requirement for electrolysis of this invention has been demonstrated at 0.45 volts. The process of this invention requires less than about 50 kilocalories (thermal) per gram mol of hydrogen produced to drive the electrolysis of Equation I, whereas conventional electrolysis of water requires more than 250 kilocalories (thermal) to generate the necessary electricity. The electrical potential requirements for the electrolysis of Equation I are sufficiently low that direct photoelectric or thermoelectric solar energy sources, such as photovoltaic or diode solar cells, thermocouples and the like, can be utilized.

The electrolysis of the reaction expressed by Equation I is desirably carried out at temperatures of about 10° to 90° C., preferred temperatures being about 25° to 60° C., at 1 atmosphere pressure. At higher pressures, the temperatures may be correspondingly higher as long as the electrolyte is maintained in liquid form. Elevated pressures for the electrolysis reaction, to produce pressurized hydrogen are dependent upon material strengths and containment. However, pressures up to about 50 to 100 atmospheres are suitable. At elevated pressures, the electrical energy inputs for electrolysis are only slightly increased, but there is an overall energy advantage to production of hydrogen by pressure electrolysis as compared to later mechanical compression. The process of this invention may be carried out at sufficiently high pressures so that further compression to produce pipeline pressures (about 50 atm) may not be necessary.

The copper sulfate pentahydrate is produced from the electrolyzer product solution by crystallization. Crystallization of pentahydrate can be achieved by one of or a combination of four techniques:

(1) heating the solution to evaporate water, thereby concentrating the solution and exceeding the solubility of the hydrated salt, (2) cooling the solution to exceed the saturation solubility of the hydrated salt, (3) electrolyzing into a saturated solution and thereby driving crystal formation by addition of copper sulfate, (4) dropping the pressure of the electrolyzer product solution (partial flash evaporation thereby also cooling) accompanied by crystallization. The preferred process method is to electrolyze into warm and concentrated (not necessarily saturated) copper sulfate solutions, and to then evaporate (and cool) by decreasing the pressure.

The hydrated copper sulfate is then passed to a reactor for thermal dehydration to copper sulfate and steam. The thermal dehydration of copper sulfate pentahydrate takes place in three steps represented by Equations IIa, IIb, and IIc, as set forth above. Tests have shown that in a pure steam atmosphere temperatures in excess of about 202° C. are required for complete dehydration and temperatures not exceeding about 402° C. will avoid decomposition of the copper sulfate. The thermal dehydration can be operated at elevated pressures to provide pressurized steam for power recovery and to provide the driving force for regeneration of some of the thermal energy required for the dehydration. Upper limits of pressure are set for any one step of dehydration by either the thermodynamic equilibrium pressure of steam or by the equilibrium between gaseous and liquid, whichever is lower at the temperature used. Relative pressures of the three steps are determined by the need to provide a thermal driving force for internal heat transfer. This heat transfer utilizes the latent heat recovered from condensation of steam products, from dehydrations of copper sulfate trihydrate and copper sulfate hydrate, to supply the heat of reaction for dehydration of copper sulfate pentahydrate. Suitable temperatures and pressures for dehydration of copper sulfate pentahydrate to copper sulfate trihydrate (Equation IIa) are about 100° to about 150° C. at about 1 to about 5 atmospheres pressure; copper sulfate trihydrate to copper sulfate hydrate (Equation IIb) are about 130° to about 200° C. at about 3 to about 15 atmospheres pressure; and copper sulfate hydrate to copper sulfate (Equation IIc) are about 200° to about 400° C. at about 3 to about 30 atmospheres pressure.

The dry copper sulfate is then thermally decomposed at temperatures of about 575° to 1025° C., preferably at about 800° to 1025° C. The reactions of Equations III and IV are not discrete reactions and usually the gaseous product obtained is a mixture of $SO_3$, $SO_2$ and $O_2$. A mixed copper oxide-sulfate complex appears to be a stable reaction intermediate at lower temperatures, but is readily decomposed to copper oxide by increasing either temperature or reaction time.

The thermal decomposition of sulfur trioxide, as shown by Equation IV, is an endothermic, homogeneous gas-phase reaction suitably carried out at temperatures greater than about 600° C. Upper limits of temperature are governed by equipment and economic considerations. Generally, the reaction is carried out at about 600° to 1200° C. A catalyst is generally employed in reaction IV, noble metal catalysts being used at lower temperatures while less expensive transition metals are suitable at higher temperatures. Since anhydrous $SO_3$ is decomposed in the cycle, problems with formation of volatile reaction products between catalyst materials and steam are avoided. Further, corrosion in the system handling $SO_3$ will be less severe for the anhydrous product. Laboratory indications are that copper oxide may have some catalytic activity on the decomposition of sulfur trioxide.

Figure 2:
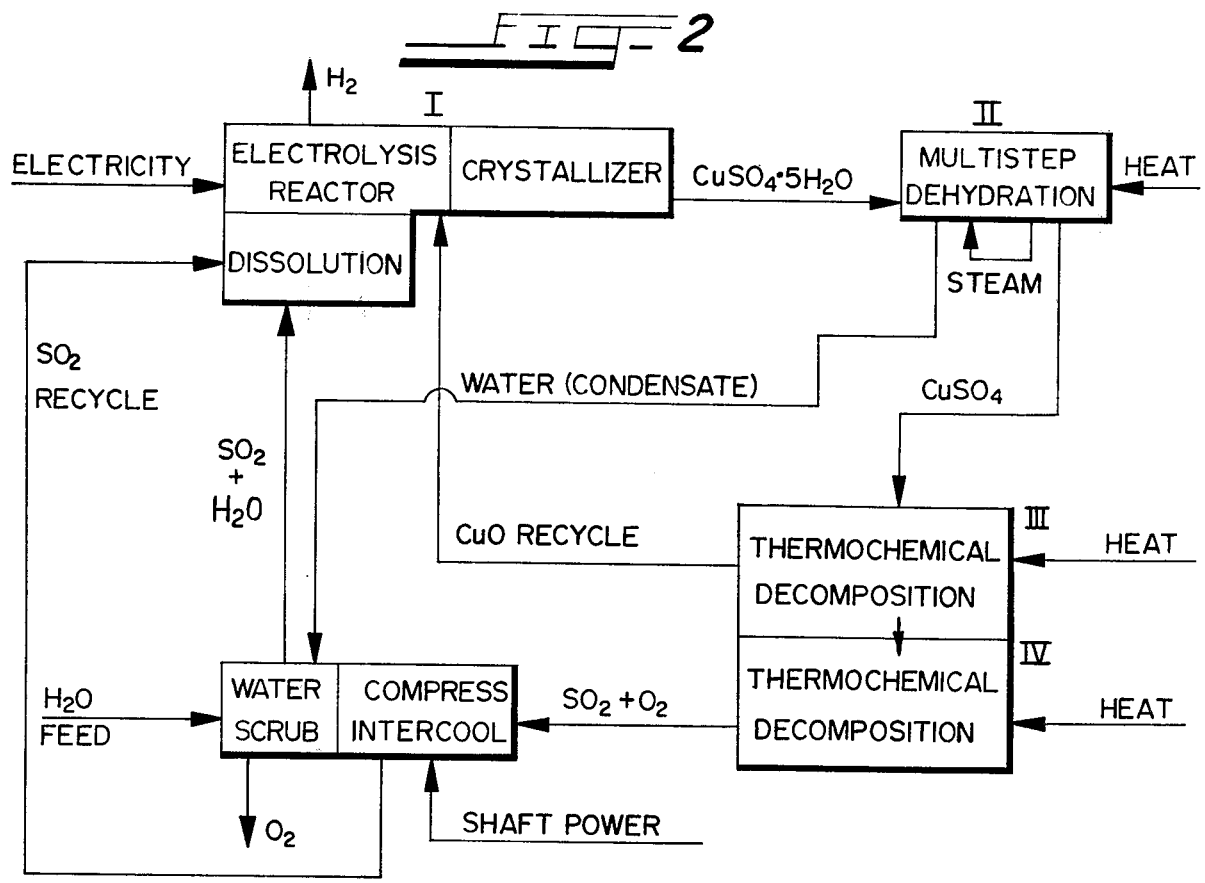
FIG. 2 is a simplified process flow diagram of one embodiment of this invention according to the schematic flow diagram of FIG. 1.

FIG. 2 shows a simplified process flow diagram of one embodiment of this invention according to the schematic flow diagram of FIG. 1. Like FIG. 1, the zones of FIG. 2 marked I through IV are the zones in which reactions expressed by the Equations I through IV, occur. FIG. 2 shows energy inputs to the cycle and shows more detailed recycle information than that summarized in FIG. 1.

FIG. 3 is a more detailed process flow layout of the closed reactant regenerative cycle shown in FIGS. 1 and 2. FIG. 3 shows the reactors where reactions set forth above take place and are shown by the reaction number stated above. Heat exchangers, with heat demands or availabilities as indicated, are shown as H-1 through H-14. Steam condensers are shown as C-1 through C4. Pumps and compressors are shown as P-1 through P-4.

In FIG. 3, electrolyzer-crystallizer 20 is shown where reaction I takes place. The electrolyzer may be operated under pressures to produce pressurized hydrogen, such as 30 atmospheres pressure. The reaction in electrolyzer 20 may be carried out at ambient temperatures of about 25° C. at which temperature the exothermic reaction generates 22 kcal which, since it is lower than the minimum heat sink temperature provided by cooling water, may be rejected. Operation of electrolyzer 20 at 0.45 volts represents a work requirement of 21 kcal. At higher temperatures which would be desirable to reduce the overvoltage of the electrolyzer, the voltage may be somewhat reduced. Hydrogen produced in accordance with reaction I is passed through scrubber 21 and removed from the cycle. The crystallizer may be operated as described above.

FIG. 3 shows reaction II being carried out in three separate reactors 22, 23 and 24, wherein the reactions IIa, IIb and IIc take place, respectively. These reactions are conducted at increasing temperatures and pressures of, for example, 100° C. and 2 atm. for reaction IIa; 152° C. and 6 atm. for reaction IIb; and 253° C. and 12 atm. for reaction IIc, whereby the heat for reaction IIa can be supplied by the latent heat of the steam produced by reactions IIb and IIc, rather than by a primary heat source, only the latent heat of the steam produced by reaction IIa being discarded.

The decomposition of copper sulfate expressed by reaction III takes place in reactor 25. Reaction IV occurs principally in reactor 26, however, reactions III and IV are not discreet. Solid copper oxide produced by reaction III is recycled to electrolyzer 20. It is desired that the sulfur trioxide composition in the electrolyzer be kept low. By catalytically decomposing sulfur trioxide at higher temperatures than maintained in reactor 25 for reaction III and conducting the reaction at the same low pressure as in reactor 25, a very low sulfur trioxide mol fraction is achieved at the outlet of reactor 25 and a separate sulfur trioxide separation and recycle to reactor 26 is not required. The total pressure in reactors 25 and 26 is about 0.1 atmospheres.

The effluent from reactor 26 is compressed with after cooling in two stages to about 1 atmosphere pressure. This lowers the temperature of the gas stream to about −40° C. causing the sulfur trioxide to crystallize and most of the sulfur dioxide to condense. The condensed phases are separated in knockout drum 27 from the gaseous phase containing the oxygen and small amounts of sulfur oxides. The liquid sulfur dioxide and dissolved sulfur trioxide are compressed by pump P3 to an elevated pressure, such as 38 atmospheres, heated to about ambient temperatures and fed to electrolyzer 20. The oxygen stream from the top of knockout drum 27 is scrubbed with water in scrubber 28 to reduce the sulfur oxides concentration in the product oxygen. The product oxygen is removed from the top of scrubber 28 and the spent medium containing sulfur dioxide is compressed and fed to electrolyzer 20. The scrubbing medium is shown to be condensate from reactions IIa, b and c, plus added process feed water.

An enthalpy balance around a flow sheet such as shown in FIG. 3, has been performed wherein the minimum temperature difference between streams and heat exchangers is 50° C. and 25° C. The load-line efficiencies for the overall process were found to be 35.9 percent and 37.3 percent, respectively.

Throughout this description and claims we have used the term "reaction zone" to describe where reactions identified take place. When we refer to reaction zones, we do not necessarily mean physically separate volumes, but different reaction zones may be within the same physical volume and under different conditions, such as temperature or pressure and referred to a different zones. Likewise, a single reaction zone may be divided into several physically different volumes under different conditions of temperature and pressure and still referred to as a single reaction zone, such as above with respect to the reactions of Equations IIa, IIb and IIc and the electrolizer-crystallizer as more fully described above. The terminology "reaction zones" has been employed to simplify the explanation of our invention.

Reactors and process equipment for carrying out the process of this invention may be of any suitable design and material as will be obvious to one skilled in the art in view of the chemicals, temperatures and pressures desired.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for the production of hydrogen and oxygen from water comprising the steps:
   electrolytically oxidizing in an electrolytic cell an aqueous solution of sulfur dioxide in the presence of copper oxide to produce copper sulfate in solution in the anode chamber while producing hydrogen in a separated cathode chamber and removing the produced hydrogen from the cycle;
   crystallizing said copper sulfate solution to solid copper sulfate pentahydrate;
   thermally dehydrating said copper sulfate pentahydrate to copper sulfate and steam; and
   thermally decomposing said copper sulfate to copper oxide and sulfur dioxide for recycle to said electrolytic cell and to oxygen which is removed from the cycle.

2. The process of claim 1 conducted in a reactant regenerative closed cycle wherein:
   the electrolytic oxidation-crystallization of aqueous sulfur dioxide in the presence of copper oxide to produce copper sulfate pentahydrate and hydrogen takes place in a first reaction zone, the produced hydrogen removed from the cycle;
   transferring the produced copper sulfate pentahydrate to a second reaction zone wherein it is thermally dehydrated to copper sulfate and steam, excess steam being recycled as water to the first reaction zone;
   transferring the produced copper sulfate to a third reaction zone where it is thermally decomposed to copper oxide and sulfur trioxide, the copper oxide being recycled to the first reaction zone;
   transferring the produced sulfur trioxide to a fourth reaction zone wherein it is thermally decomposed to sulfur dioxide and oxygen, the produced sulfur dioxide being recycled to the first reaction zone and the produced oxygen removed from the cycle; and
   water being added to the cycle in the first reaction zone.

3. The process of claim 2 wherein copper sulfate pentahydrate is thermally dehydrated at increasing temperatures of about 100° to about 400° C. and increasing pressures of about 1 to about 30 atmospheres.

4. The process of claim 3 wherein copper sulfate pentahydrate is thermally dehydrated to copper sulfate trihydrate at about 100° to about 150° C., copper sulfate trihydrate dehydrated to copper sulfate hydrate at about 130° to about 200° C., and copper sulfate hydrate dehydrated to copper sulfate at about 200° to about 400° C.

5. The process of claim 3 wherein copper sulfate pentahydrate is thermally dehydrated to copper sulfate trihydrate at about 100° to about 150° C. and about 1 to about 5 atmospheres pressure, copper sulfate trihydrate dehydrated to copper sulfate hydrate at about 130° to about 200° C. and about 3 to about 15 atmospheres pressure, and copper sulfate hydrate dehydrated to copper sulfate at about 200° to about 400° C. and about 3 to about 30 atmospheres pressure.

6. The process of claim 2 wherein copper sulfate is decomposed to copper oxide and sulfur oxide at about 575° to about 1025° C.

7. The process of claim 6 wherein copper sulfate is decomposed to copper oxide and sulfur oxide at about 800° to about 1025° C.

8. The process of claim 2 wherein copper sulfate is decomposed principally to copper oxide and sulfur trioxide at about 575° to about 1025° C. and sulfur trioxide is decomposed to sulfur dioxide and oxygen principally at temperatures greater than about 600° C.

9. The process of claim 8 wherein sulfur trioxide is decomposed to sulfur dioxide and oxygen principally at temperatures of about 600° to about 1200° C.

10. The process of claim 2 wherein the electrolytic oxidation is conducted at an elevated pressure thereby producing pressurized hydrogen.

11. The process of claim 10 wherein the electrolytic oxidation is conducted at about 5 to about 100 atmospheres pressure.

12. The process of claim 1 wherein copper sulfate pentahydrate is thermally dehydrated at increasing temperatures of about 100° to about 400° C. and increasing pressures of about 1 to about 30 atmospheres.

13. The process of claim 12 wherein copper sulfate pentahydrate is thermally dehydrated to copper sulfate trihydrate at about 100° to about 150° C., copper sulfate trihydrate dehydrated to copper sulfate hydrate at about 130° to about 200° C., and copper sulfate hydrate dehydrated to copper sulfate at about 200° to about 400° C.

14. The process of claim 12 wherein copper sulfate pentahydrate is thermally dehydrated to copper sulfate trihydrate at about 100° to about 150° C. and about 1 to about 5 atmospheres pressure, copper sulfate trihydrate dehydrated to copper sulfate hydrate at about 130° to about 200° C. and about 3 to about 15 atmospheres pressure, and copper sulfate hydrate dehydrated to copper sulfate at about 200° to about 400° C. and about 3 to about 30 atmospheres pressure.

15. The process of claim 1 wherein copper sulfate is decomposed to copper oxide and sulfur oxide at about 575° to about 1025° C.

16. The process of claim 15 wherein copper sulfate is decomposed to copper oxide and sulfur oxide at about 800° to about 1025° C.

17. The process of claim 1 wherein copper sulfate is decomposed principally to copper oxide and sulfur trioxide at about 575° to about 1025° C. and sulfur trioxide is decomposed to sulfur dioxide and oxygen principally at temperatures greater than about 600° C.

18. The process of claim 17 wherein sulfur trioxide is decomposed to sulfur dioxide and oxygen principally at temperatures of about 600° to about 1200° C.

19. The process of claim 1 wherein the electrolytic cell is operated at an elevated pressure thereby producing pressurized hydrogen.

20. The process of claim 19 wherein the electrolytic cell is operated at about 5 to about 100 atmospheres pressure.

21. In a reactant regenerative closed cycle process for the production of hydrogen and oxygen from water the steps comprising:
   electrolytically oxidizing an aqueous solution of sulfur dioxide in the presence of copper oxide to produce copper sulfate solution in the anode chamber and hydrogen in a separated cathode chamber;
   crystallizing the copper sulfate solution to solid hydrated copper sulfate;
   thermally dehydrating the copper sulfate hydrate to copper sulfate and steam; and
   thermally decomposing said copper sulfate to copper oxide, sulfur dioxide and oxygen, the primary energy input requirement of the process being thermal.

* * * * *